United States Patent Office 3,316,289
Patented Apr. 25, 1967

3,316,289
ESTERIFICATION OF POLYVALENT ALKANOLS WITH NITRIC ACID IN LIQUID SULPHUR DIOXIDE
Johan T. Semeyns de Vries Van Doesburgh, Geleen, and Johannes J. M. Deumens, Nuth, Netherlands, assignors to Stamicarbon N.V., Heerlen, Netherlands
No Drawing. Filed Sept. 26, 1966, Ser. No. 581,740
Claims priority, application Netherlands, Oct. 1, 1965, 6,512,732
5 Claims. (Cl. 260—467)

The invention relates to a process for the esterification of polyhydric alkanols with nitric acid.

Various esters may be made by such an esterification process, including glycerol trinitrate, glycerol dinitrate, ethylene glycol dinitarate and diethylene glycol dinitrate. In the manufacture of such esters special precautions have to be taken, of course, because the esters may be more or less explosive.

According to such an esterification process which has been used in the past, the ester, glycerol trinitrate for example, has been made by treating glycerol, with an excess of a nitric acid-sulphuric acid mixture with simultaneous cooling. After the esterification reaction is complete, the ester product, glycerol trinitrate, is isolated from the remaining acid mixture and further processed. The above reaction with the acid mixture is known to be highly exothermic, and requires very accurate temperature control of the reaction mixture in order to avoid an explosion.

The present invention provides a process which offers considerable advantages over the known procedures. According to this present process, the esterification reaction between the polyhydric alkanol and the nitric acid is carried out with a nitrating acid in a liquid sulfur dioxide reaction medium. By the term "nitrating acid" is meant here in a mixture of nitric acid and a water-binding substance, such as sulphuric acid, sulphur trioxide and similar acid anhydrides. Preferably, the nitric acid content of such mixture is between 38 to 43 mol percent. Even though mixtures of nitric acid and sulphur dioxide have been found to be explosive by themselves, and thus such a combination should certainly not be employed in the manufacture of the esters herein involved, it has now been found that the process according to the present invention can nevertheless be carried out without difficulty.

In the practice of this invention, the heat set free during the exothermic esterification reaction can be easily removed by evaporation of liquid sulphur dioxide, and thus local overheating of the reaction mixture can be avoided much more readily and effectively than in the presently known processes. Furthermore, the presence of liquid sulphur dioxide offers the additional advantage that the total reaction mixture is less viscous, so that the esterification can be carried out at lower temperatures.

After the esterification reaction is complete, a two liquid-layer system is present. One layer is the sulphur dioxide layer which contains hardly any acid, and substantially the entire amount of the ester formed. Thus, further processing to remove the ester can be accomplished by a very simple procedure. The ester can also be stored and transported as a solution in the liquid sulphur dioxide, and there is thus no need for isolating it in the undissolved state until needed. Thus the present invention provides for nitrate ester product in a conveniently safe medium, and the usual precautionary safety measures may be greatly simplified.

The process according to the present invention can be carried out in various specific ways, for example by feeding the polyvalent alkanol, whether or not already dissolved in liquid sulphur dioxide, to a mixture or liquid sulphur dioxide and the nitrating acid. Alternatively, the nitrating acid may be supplied to a solution of the polyvalent alkanol in liquid sulphur dioxide. Other procedures are also possible.

The invention will be further understood by reference to the following examples, but these examples are only illustrative of various ways of practicing the invention.

EXAMPLE 1

40 millilitres of liquid sulphur dioxide are measured into a 250 ml. flask provided with a drain valve at the base, a stirrer, a reflux cooler and dropping funnel.

24.5 g. of sulphuric acid of 96% w. concentration and 10.5 g. of nitric acid of 98.5% w. concentration are successively added to the sulphur dioxide in the flask by means of the dropping funnel. After that, 4.6 g. of glycerol dissolved in 25 ml. of liquid sulphur dioxide are added gradually, with simultaneous stirring, to the mixture in the flask. Upon the addition of the glycerol the reaction mixture is stirred for another 1.5 hr. Then, the lower acid layer is separated from the supernatant sulphur dioxide layer by means of the drain valve.

Examination by nuclear magnetic resonance, chromatographic analysis and infrared spectroscopy showed that the sulphur dioxide layer contained glycerol trinitrate as the only organic component.

The total acid layer was found to contain only 1% w. of carbon calculated to the quantity of glycerol added. No other carbon having been removed from the reaction system, it may be concluded that the glycerol had been nearly quantitatively converted to glycerol trinitrate.

EXAMPLE 2

40 ml. of liquid sulphur dioxide are measured into a flask identical to that used in Example 1. After that, 17 g. of sulphuric acid of 96% w. concentration and 7.4 g. of nitric acid of 98.5% w. concentration are successively added to the sulphur dioxide in the flask. Next, 3.1 g. of ethylene glycol are added slowly, with simultaneous stirring, to the mixture in the flask. Upon the addition of ethylene glycol stirring is continued for approximately 1.5 hr. Then, the acid layer is separated from the supernatant sulphur dioxide layer. The two layers are examined in the same way as described in Example 1. The results showed that the ethylene glycol had been nearly quantitatively converted to ethylene glycol dinitrate.

It will be appreciated the advantages of this invention may be realized in many different ways, and the scope of this patent is limited only by the spirit and meaning of the following claims.

What is claimed is:
1. In processes for the esterification of polyhydric alkanols with nitric acid, the improvement which consists essentially in reacting the polyhydric alkanol with a nitrating acid in a liquid sulphur dioxide reaction medium.
2. The process of claim 1 wherein the exothermic heat of the reaction is removed by autogenous evaporation of said liquid sulphur dioxide.
3. The process of claim 1 wherein sad polyhydric alkanol is selected from the class consisting of glycerol ethylene glycol and diethylene glycol.
4. The process of claim 1 wherein said nitrating acid is a mixture of nitric acid and a member selected from the class consisting of sulphuric acid and sulphur trioxide.

5. The process of claim 4 wherein the nitric acid content is between about 38 to 43 mol percent.

References Cited by the Examiner

UNITED STATES PATENTS

| | | | |
|---|---|---|---|
| 2,717,903 | 9/1955 | Ruth | 260—467 |
| 3,086,042 | 4/1963 | Blair | 260—467 |
| 3,214,458 | 10/1965 | Rooij et al. | 260—467 |

OTHER REFERENCES

Boschan et al., Chemical Reviews, vol. 55, pp. 487 to 490 (1955).

Varma et al., J. Am. Chem. Soc., vol. 47, pp. 143 to 147 (1925).

CARL D. QUARFORTH, *Primary Examiner.*

L. A. SEBASTIAN, *Assistant Examiner.*